March 1, 1966 L. FAIVELEY 3,238,314

POWER PICK-UPS FROM OVERHEAD LINES

Filed Oct. 17, 1960 5 Sheets-Sheet 1

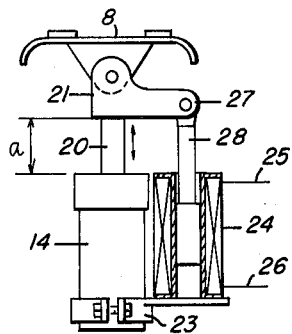
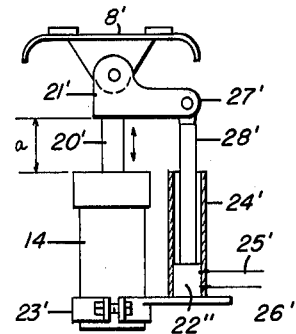
FIG.5         FIG.5'
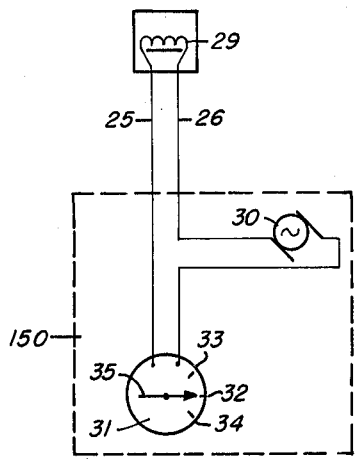
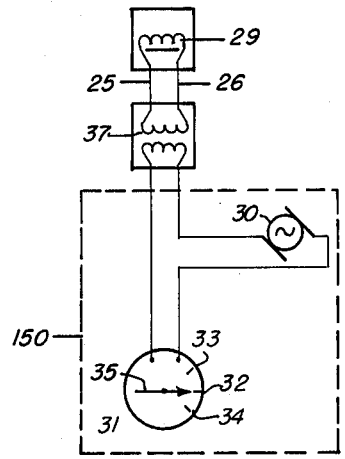
FIG.6         FIG.7

March 1, 1966  L. FAIVELEY  3,238,314
POWER PICK-UPS FROM OVERHEAD LINES
Filed Oct. 17, 1960  5 Sheets-Sheet 3

March 1, 1966  L. FAIVELEY  3,238,314
POWER PICK-UPS FROM OVERHEAD LINES
Filed Oct. 17, 1960  5 Sheets-Sheet 4

March 1, 1966  L. FAIVELEY  3,238,314
POWER PICK-UPS FROM OVERHEAD LINES
Filed Oct. 17, 1960  5 Sheets-Sheet 5

United States Patent Office 3,238,314
Patented Mar. 1, 1966

3,238,314
POWER PICK-UPS FROM OVERHEAD LINES
Louis Faiveley, 17 Ave. Bugeaud, Paris, France
Filed Oct. 17, 1960, Ser. No. 63,168
6 Claims. (Cl. 191—66)

The invention relates to power pick-ups from overhead lines.

It is the object of this invention to ensure a constant pressure of the brushes or of the bow against the catenary.

The conventional power pick-up for high speeds combines at least two elastic suspensions: firstly, the springs which balance the weight of the lifting arrangement; and secondly, the springs which suspend resiliently and with a comparatively weak inertia the bow or the brushes from the lifting arrangement. Since these latter have a limited elastic travel, although the level differences of the overhead lines may reach values of two metres when passing under artificial structures i.e. such as bridges, tunnels and the like, it has, as yet, not been possible to separate these functions clearly, namely on the one hand, the balancing function, and on the other hand, the function of ensuring that the brushes or the bow are urged by a sufficient pressure to meet the electric and electrodynamic requirements necessary for the take-off of high power.

Since the balance springs participate in the pressure urging the bow or brushes against the catenary, the units respond only badly to pressure variations due to outside influences, either acting directly on the lifting arrangement, such as wind or frost, or acting indirectly on the lifting arrangement through the bow or the brushes, such as said artificial structures and, in the latter case, because of the excessive inertia of the entire system.

Partial solutions of the problem have been attempted in changing the tension control of the balance springs so as to take into consideration either the passage from one overhead line to another at a different level, or the passage from a heavy overhead wire to a light one or vice-versa, or to take into consideration the power taken off the power line. It has also been suggested to provide cam means to vary the tension of the springs in order to take into consideration the effects of level differences caused by artificial structures, where the catenary is locally lowered, and where the passing-by causes the relative currents of air to vary.

At any rate, as yet nothing has been proposed in order to follow, in a continuous and permanent manner, the pressure variations of the brushes of the bow against the overhead line in order to maintain the pressure at a constant value, whatever may be the causes of the variations.

It must also be noted that yet whenever the pressure variations at the catenary are made the subject of study, the aim is only to measure this pressure. The measurements are effected in the absence of traction current, and the electric locomotive is in this case pulled by a steam or oil locomotive.

According to this invention and with the object to maintain at a predetermined value the pressure exerted by the brushes or by the bow on the overhead line, said pressure is measured under tension, during normal traffic and in a continuous and permanent manner, and the results of these measurements are used to effect, by means of suitable arrangements, the lifting mechanism of the lifting arrangement of the current pick-up, whereby the action on the lifting mechanism may be effected either manually or automatically by means of any servo-control device capable of translating the measuring results into an order of movement.

The pressure variations may be measured either directly by measuring the variations in the tension of the springs by means of which the brushes or the bow are supported relative to the lifting device, or indirectly, by measuring the variations in the elongation of said springs which may, according to the kind of suspension device used, result in a linear or in an angular measurement.

By way of example of the direct measurement of the variations in the spring tension or elongation of springs the well known piezo-electric methods may be mentioned, either by using a quartz which is electrically charged by the compression, and which has the advantage of not requiring an external source of energy, or by using a carbon, the resistance of which varies with the charge or load. In addition, there are also known in the art extensometric gauges, whereby the stress supported by the supporting rod or by the supporting surfaces of a spring may be measured.

By way of example of the indirect measurement of the pressure variations through measuring the variations in the elongation of the spring, there may be mentioned various conventional servo-control devices of many known types, pneumatic, hydraulic, electric, or electro-pneumatic, hydro-electric, or hydro-pneumatic, in which an input movement, in this case the relative movement between the brushes or the bow and the lifting mechanism, is translated, more or less remotely, into an unequivocal output movement which is used for measuring or control purposes.

Nowadays, there are known industrial servo-control devices, which have a response time of the order of a thousandth of a second, which represents, at a travelling speed of the locomotive of 180 km./h., a distance of 0.05 metre.

It will be noted that, for the application of the present invention, the result of the direct measurement, for example, by means of the piezo-electric methods, may be translated by the occurrence of a current or of a voltage. There results finally the possibility of using an electric, or hydro-electric, or electro-pneumatic, conventional servo control, in which the amplitude of the output movement is a function of an input voltage.

In the following, a very simple example of embodiment of the invention is outlined for the case, where the effects of hoar-frost should be overcome, which by excessively loading the lifting arrangement may cause loss of contact between the brushes or bow and the catenary.

In this example, the invention has been applied to a conventional pantograph, but it must be understood that the invention may be applied to any articulated lifting arrangement, whether this arrangement comprises a separate suspension for the brushes or the bow on the lifting device or whether a feeling device is added to the lifting device for the measurement of the pressure on the overhead line.

In the accompanying drawings:

FIGURE 5 shows a measuring arrangement of the invention mounted on the pantograph of FIGURES 1 to 4.

FIG. 5' is a view generally similar to FIG. 5 illustrating the use of piezometric quartz or carbon.

FIGURES 6 and 7 are electric circuit diagrams between the measuring arrangement and the indicating device.

Figure 8:
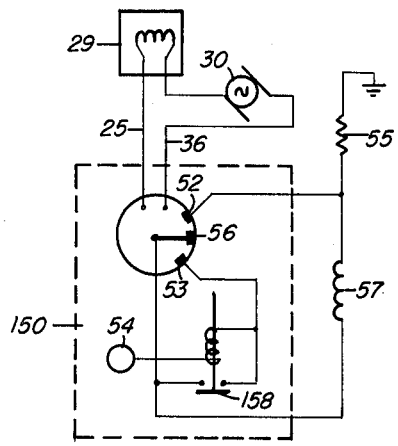

FIGURE 8 is the diagram of FIGURE 6, the indicating device being replaced by a commutator.

Figure 9:
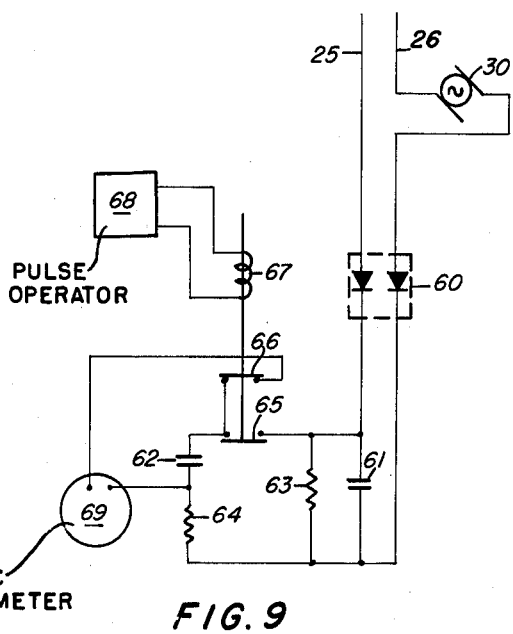

FIGURE 9 is the diagram of FIGURE 6, including an integrating device.

Figure 10:
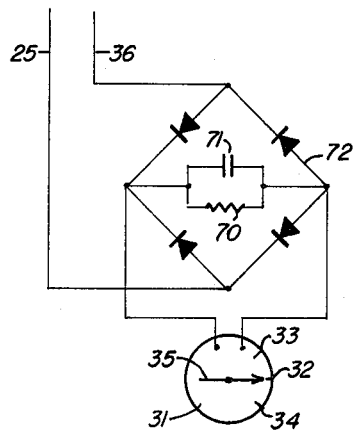

FIGURE 10 is the diagram of FIGURE 6 including a filtering and detecting device.

Figure 11:
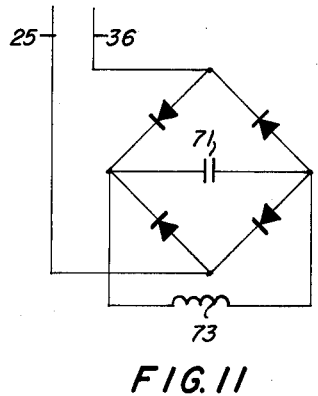

FIGURE 11 is a modification of the diagram of FIGURE 10 with direct control of the electro valve controlling the motors of the lifting device.

Figure 14:
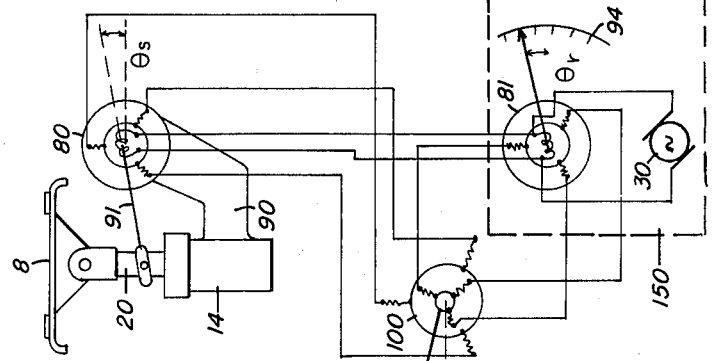
Figure 13:
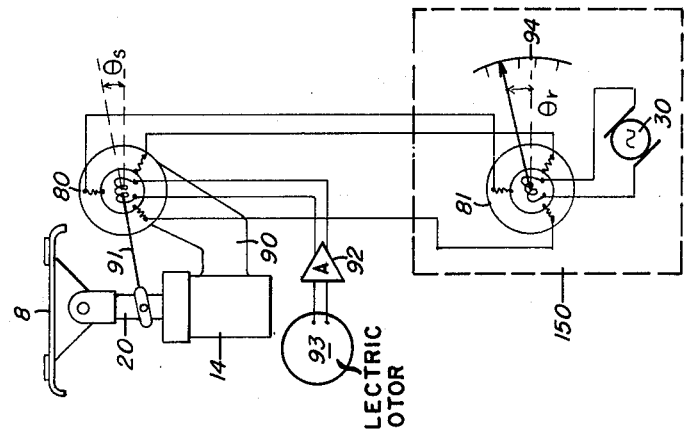
Figure 12:
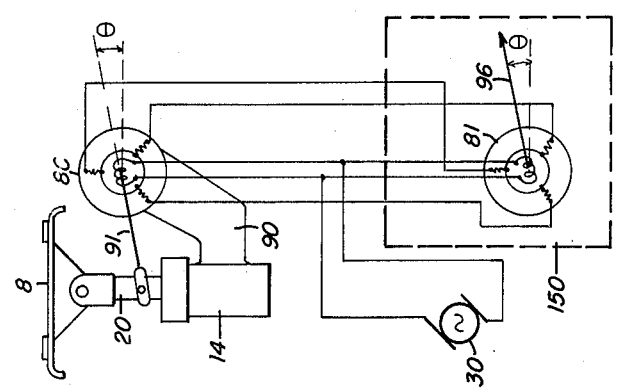

FIGURES 12 to 14 are electric diagrams including selsyns as measuring means.

Figure 15:
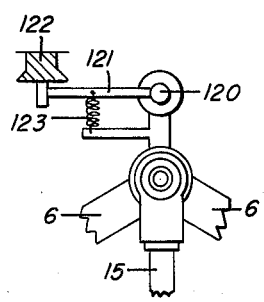

FIG. 15 shows another known type of bow supporting device.

Figure 16:
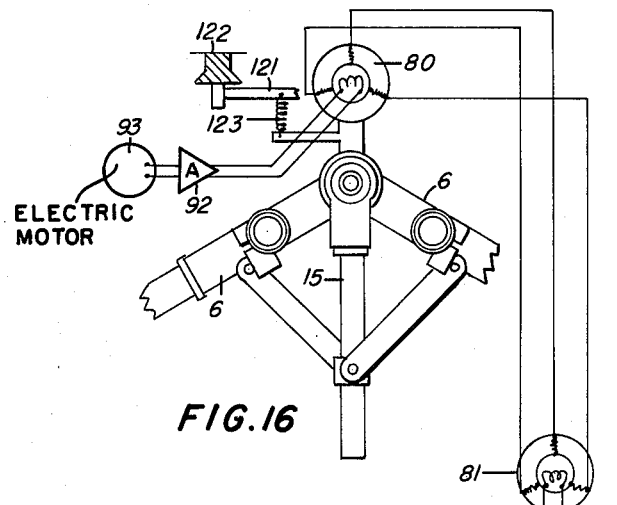

FIGURE 16 shows an electric servo control for the bow supporting device of FIGURE 15.

Figure 17:
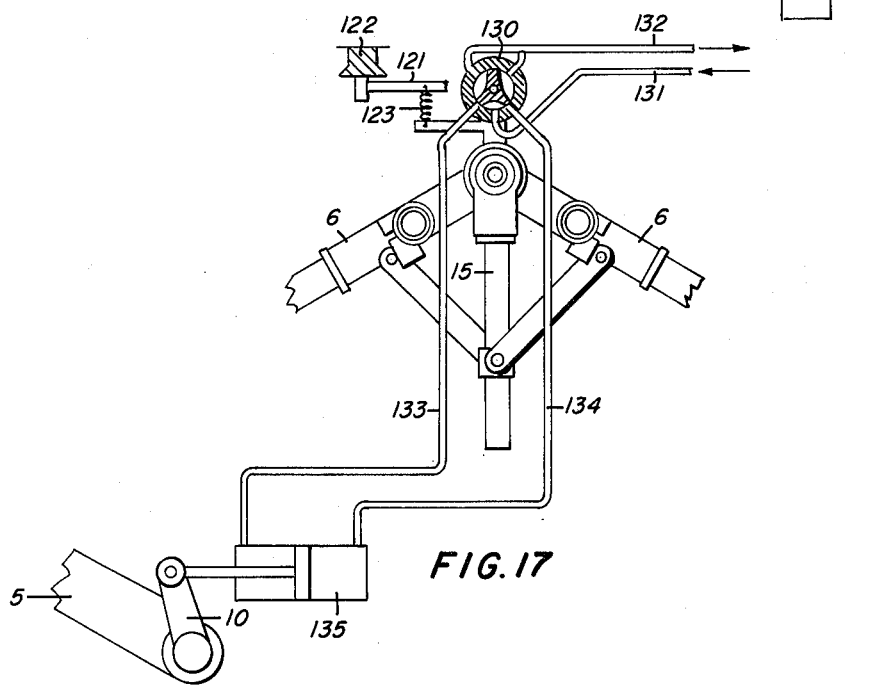

FIGURE 17 shows a hydraulic servo control for the same bow supporting device as in FIGURE 16.

In order to simplify the drawings, only those parts have been included therein which are strictly necessary for the understanding of the invention, and the usual control motor for lifting and lowering the pantograph as well as the conventional coupling means connecting said motor to the control shafts 4 have not been included.

FIGURES 1 to 5 show the pantograph, comprising a frame 1, fixed on the roof of the locomotive (not shown) through the insulators 2. The frame has bearing blocks 3 in which are pivotably located shafts 4, solid in rotation with the lower arms 5, on the other extremity of which are articulated the upper arms 6; said arms 6 are articulately connected one with the other on the shaft 13 by hinge means 7 as shown in detail in FIGURES 3 and 4. A conventional pick-up bow 8, is mounted on the pantograph, as will be described hereinafter. The overhead line is not shown. One or several groups of springs 9 exert a tensile stress through the lever 10 of arms 4, so that they not only balance the weight of the mobile part of the pantograph, comprising the elements 5, 6 and 8, but also contribute to urge the bow 8 against the overhead line with a certain amount of pressure.

Figure 2:
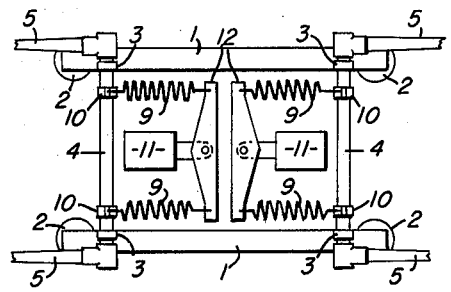
Figure 3:
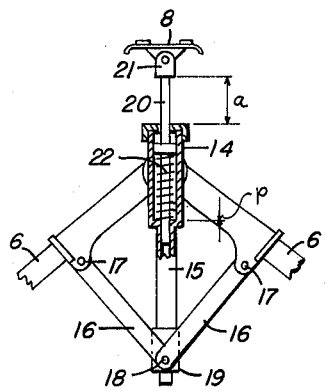
FIGURES 3 and 4 show, on a large scale, side elevations with partial cross-sectional views, of the suspension of the bow on the lifting arrangement.
Figure 4:
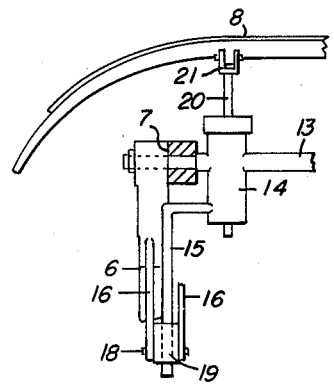

Each of the extremities of springs 9, opposite to the extremities fixed to the levers 10, may be controlled either directly by means of a compressed air motor, or indirectly, as shown in FIGURE 2, In this figure, the extremities of both springs acting on the same shaft 4 are connected by means of a cross-member 12 actuated by a compressed air motor 11, such motor including as usual in the art conventional air admitting and exhausting means, not represented, and being controlled as usual in the art, by means of conventional electro-valves. Thus, two motors 11 act on the two cross-members 12 respectively and the unit is symmetrical relatively to a vertical plane transverse to the track, in which the bow moves, and relatively to a vertical median plane, parallel to the track.

When air is admitted to a conventional pneumatic jack 11 having conventional admitting and exhausting valve means in order to act on the springs 9, the pressure against the overhead line is increased, and if air is purged, allowing the springs 9 to contract, the pressure on the line is decreased. The bow 8 is mounted on the assembly 7 in the following known manner (FIGURES 3 and 4): The arms 6 are articulated at 7 one to the other and to a transverse member 13, which has cylindrical spring casings 14 rigidly fixed to both its ends. Each casing is provided with a stem 15, which is kept constantly in vertical position by the links 16, articulated at one end at 17 to the arms 6, and on the other end at 18 to a slide 19, sliding on the stem 15, which serves as guide. Thus, the axis of each spring casing 14 remains always vertical. In each spring box or casing, there slides a rod 20, the head 21 of which supports the bow 8 through a hinge, said rod 20 being resiliently supported by the casing 14 through a spring 22.

When the pressure against the overhead line rises, the pressure $p$ of the spring against the base of casing 14 increases and the distance $a$ decreases, whereas, with decreasing pressure, the opposite holds true. It is, therefore, possible to measure the pressure of the bow against the line directly by measuring the pressure $p$ or by measuring the distance $a$, or even by measuring the strain of the rod 20 or of the wall of the casing 14 supporting the tension of the spring.

In the example of FIGURE 5, the distance $a$ is measured; for this purpose, an electromagnetic variometer is used by means of which the variations of this distance are translated into current intensity variations.

It is known that, in a coil supplied with constant alternating voltage, the current intensity will decrease with increasing inductance, and vice versa. If, therefore, in such a coil a magnetic metal core is displaced gradually, so as to increase the magnetic flux, the inductance will increase according to the penetration of the core, and the current intensity will decrease.

On the spring casing 14 (FIGURE 5) is mounted, by means of a support 23, a coil 24 connected through wires 25 and 26 to a supply source. The head 21 of rod 20 has an arm 27 connected thereto. Arm 27 has fixed thereto a soft iron plunger-type core 28. If the distance $a$ decreases, the plunger 28 enters more deeply into the coil 24, and the current intensity flowing through the wires 25 and 26 decreases. The opposite effect is produced, if the distance $a$ increases. In the diagram of FIGURE 6, the arrangement of FIGURE 5 is shown schematically at 29. Reference numeral 30 indicates a constant voltage alternating current generator, 31 an ammeter, affording any suitable number of reference marks, for example, three as shown in the drawing, 32 indicates the medium pressure exerted on the overhead line by the bow 8, 33 being the maximum permissible pressure of the brush, which must not be exceeded, and 34 being the minimum pressure, necessary for a good pick-up action.

With reference to FIG. 5', it will be noted that an assemblage including a piezometric quartz or carbon is shown. More specifically, a device comprising tube or cylinder 24', plunger 28' supported by arm 27' of head 21', which head in turn is connected to rod 20' slidable in casing 14' is mounted on the casing 14' by support 23'. Pick-up bow 8' is also carried by the head 21'.

A piezometric quartz or carbon denoted generally 22" is located in proximity to the lower end of the tube 24' and wires or conductors 25', 26' are coupled to the tube 24' and lead to a source of supply.

If the distance $a$ tends to decrease, the plunger 28' presses more on the component 22". The above assemblage may replace the corresponding elements illustrated in FIG. 5 and denoted 29 in FIG. 6. However, in FIG. 6, the ammeter is to be substituted by an integrator, since in such situation, the signal is no longer the current but quantities of electricity as described in connection with FIG. 9.

The arrangement 29 is mounted on the pantograph as shown in FIGURE 5, generator 30 is inside the locomotive and indicator 31 under observation by the driver.

With normal pressure of the bow against the overhead line the pointer 35 points to reference numeral 32. If the arms 5, 5 (lifting arrangement of the pantograph) are, for example, covered with a layer of ice, caused by the locomotive passing through a zone of icy fog, the weight of this ice is added to the weight of the mobile parts of the lifting device and will reduce the pressure exerted on the overhead line by the bow 8, as a consequence of the fact that the lifting device goes down, the bow 8 being maintained applied on the stationary overhead lines by the spring 22; hence, the distance $a$ increases, and the core 28 tends to slide out of coil 24, the intensity in the wires 25 and 26 increases, the pointer 35 will approach reference numeral 34. Before this value is reached, the driver can momentarily excite an electro-valve (not shown), whereby air is supplied to the motors 11, in order to increase the tension of the springs 9, which will compensate for the pressure loss exerted by the bow 8 on the overhead line, and the pointer 35 will return to position 32. With the ice melting, the pressure exerted by the bow on the overhead line is gradually increased, the distance $a$ decreases, the plunger 28 will slide deeper into the coil 24, the current intensity in the wires 25, 26 will decrease, and the pointer moves towards position 33. At this instant, the driver can momentarily excite an electric purge valve, restoring the original pressure in motors 11 and reducing thus the pressure of the bow on the overhead line to its normal value.

Figure 1:
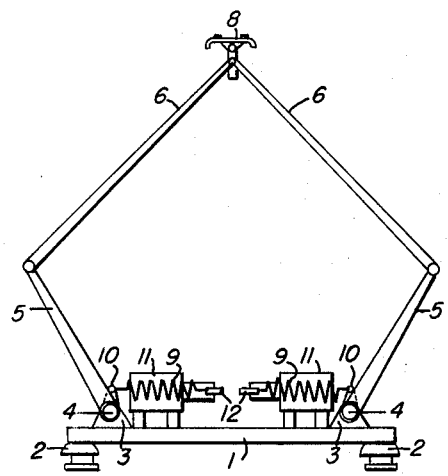
FIGURES 1 and 2 show, respectively, a side elevation and top view of a conventional lifting arrangement with the balance springs for example as described in the French Patent No. 1,189,640.

If desired, the indicator 31 may be replaced by a commutator, which controls automatically the two electro-valves controlling the admitting and the exhausting means of the pneumatic motors 11 shown in FIGURES 1 and 2.

In such a case, one may dispense with one of said electro-valves, as shown in FIGURE 8, which corresponds to the basic diagram of FIGURE 6 with the same references being utilized for the common parts. In said figure, 51 is a commutator with two stationary contacts 52, 53, the rotary contact 56 being controlled by the current in circuit 25, 36 as the pointer of an electrodynamic ammeter is controlled by the mechanism of the ammeter type indicator (the use of ammeters for measuring electric current is so conventional that no further description of the same is necessary. See the definition thereof in "American Standard of American Institute of Electrical Engineers"), contact 53 is connected to a source 54 which may be a battery of accumulators or the generator 30; contact 52 is connected to the ground through a resistor 55. The rotary contact 56 is also connected to resistor 55. In the circuit between 56 and 55 is mounted in series the winding 57 of an electro-valve, the winding being only represented, said electro-valve controlling the admitting and exhausting means of the pneumatic motors 11 of FIGURES 1 and 2 in a conventional manner, with air being admitted when the winding of the electro-valve is excited, and air is exhausted when the winding is deenergized. An example is described in Australian Patent No. 14,256, or in French Patent No. 1,224,196. 58 is a conventional self maintaining contact, the control winding of which is in series between 53 and 54. Consequently contact 58 energizes the circuit when rotary contact 56 arrives on fixed contact 53 thus energizing the winding 57 of the electro-valve, said circuit remaining closed if rotary contact 56 leaves contact 53, and contact 58 opens the circuit when rotary contact arrives on fixed contact 52.

The functioning is as follows: If intensity increases in circuit 25, 36, the rotary contact 56 is displaced towards contact 53; when contact 56 reaches contact 53, the circuit and hence the winding 57 is energized.

Hence, a sole electro valve 57 controlling the admitting and exhausting means supplies the motors 11 of the lifting device (see FIGURES 1 and 2).

Consequently, as explained for FIGURE 6, the intensity decreases in circuit 25–36 and the rotary contact 56 is displaced towards fixed contact 52, the contact 58 remaining closed until contact 56 reaches contact 52 hence the winding 57 of the electro-valve is deenergized. At this point, contact 58 and winding 57 are shunted, contact 58 opens and the electro valve 57 controlling the admitting and exhausting means of the motors 11 vents the inside of motors 11.

The entire circuit shown in FIGURE 6, including the instruments 29, 30, 31, may be energized by a current, the origin of which (generator 30) differs from that flowing through the pantograph and energizing the driving motors of the locomotive. For this reason, this circuit must be electrically insulated by suitable means from the high voltage traction circuit.

FIGURE 7 shows a modification of the diagram of FIGURE 6. If the overhead line is under high tension, the separation of the parts at low voltage from the parts at high voltage must be seriously studied. It may be effected easily by using a suitably mounted transformer 37 which separates that part of the circuit, in which the variometer is located in series, from the part in which the apparatuses 30 and 31 are located. If a transformer 37 is used, it is even possible to dispense with the generator 30 and to take the power required from the pantograph through an expediently provided voltage regulator.

Finally, if the flexibility or irregularities of the contact wire cause frequent small amplitude fluctuations of the bow 8 in the vertical direction, the distance $a$ and the current intensity will constantly vary, causing pointer 35 of FIGURES 6 and 7 to vibrate, and making difficult the reading of the indications. This may be corrected by fitting into the circuit, instead of indicator 31, and electricity meter similarly connected to the conductors 25 and 26 of FIG. 6. In this case, it is no longer the intensities which are translated, but the quantities of electricity received by the electricity motor in equal periods of time. These quantities can be read on a suitable quadrant by means of regularly spaced impulses provided by any conventional device and compared to a base reading, corresponding to the normal pressure of the bow on the line.

This is shown in FIGURE 9 in which the electricity meter is a ballistic galvanometer, the common parts with the basic diagram of FIGURE 6 are designated by the same references.

In FIGURE 9, 60 is a conventional rectifier device connected to the conductors 25 and 26 of FIG. 6, 61 and 62 are condensers, 63 and 64 are resistors, 65 and 66 are two solidary contacts controlled by relay 67, which is controlled by a conventional electron device 68 providing regularly spaced discharges, 69 is ballistic galvanometer, the quadrant of which replaces the quadrant of the ammeter device 31 of FIGURE 6. The circuit represented suppresses the alternative component of the current, secures an adjustable time constant, by means of 61 and 63; condenser 62 is charged, and alternatively discharges in the galvanometer 69 according to the alternate movements of both contacts 65 and 66.

With the same object of suppressing the vibrations of pointer 35 of FIGURE 6, or eventually, the vibrations of the rotary arm of a commutator, a conventional detecting and filtering circuit may be used instead of the integrator and of the impulse generator of FIGURE 9. This is represented in FIGURE 10, in which said circuit is represented by a resistor 70 and a condenser 71, connected parallel to each other and diagonally in a bridge rectifier 72, included in the circuit of 25 and 36.

According to another embodiment, as shown in FIGURE 11, the resistor 70 of FIGURE 10 may be replaced by the winding 73 of the electro-valve controlling the motors 11 of FIGURES 1 and 2 in the same manner as explained for the winding 57 of FIGURE 8. In such a case said winding is to be rated to promote the functioning of the valve for two predetermined values of the intensity in circuit of 25 and 36. Each value corresponding respectively to the supply and the communication with the atmosphere of the insides of motors 11.

The basic diagrams of FIGURES 6 and 7 may be used also for other means of servo controls.

In FIGURES 12 to 14, the embodiments will be given in which synchro systems are utilized in the measuring devices and the control device may be by way of example, visual and manual in FIGURE 12, automatic and electric in FIGURE 13, and automatic and hydraulic in FIGURE 14.

The lifting device is the same as in FIGURES 1 to 4, with the common parts being designated by the same references.

In FIGURES 12 to 14, a bracket 90 is provided on the box 14 of FIGURE 5, supporting a synchro transmitter 80, the rotor of which is controlled by a rod 91; said rod is articulated on shaft 20 by means of any conventional joint, securing the transformation of the translation movement of shaft 20 in a rotary movement. This joint is schematically represented in the figures.

More particularly in FIGURE 12, use is made of a synchro receiver 81, which is disposed in the cabin of a locomotive.

The movements of the rotor of the receiver 81 may be utilized to visualise the pressure on the overhead line by means of pointer 96, or may be utilized as a relay for the control of the motors 11 of the lifting device.

FIGURE 13 shows another embodiment in which the selsyn 81 is used in a synchro comparator system.

In this figure the rotor of selsyn 81 is supplied by generator 30 under constant voltage. Said rotor is set on a fixed and predetermined position with the angular displacement. $\theta r$ being the representation of the desired pressure on the overhead line. The rotor of selsyn 80 gives an angular displacement $\theta s$ representative of the actual pressure on the overhead line. The voltage at the output of selsyn 80 being proportional to $\theta s-\theta r$, the current may be amplified in amplifier 92 to supply an electric motor 93 which may be coupled by any suitable gear means with the shafts 4 of the lifting device (see FIGURES 1 and 2).

The driver of a locomotive may vary the predetermined pressure on the overhead line by varying the position of the pointer of a corresponding quadrant 94.

According to the embodiment represented in FIGURE 14, the synchro system includes a synchro differential receiver 100.

According to the position of the selsyns 80 and 81, they transmit to receiver 100 their voltage output signals, corresponding to the angular displacements $\theta r$ and $\theta s$, $\theta r$ being the reference angle as in the embodiment of FIGURE 13. The angular displacement $\theta x$ is proportional to $\theta s-\theta r$. Rod 101, solid in rotation with the rotor of receiver 100, is articulated by means of a conventional hinged connection 102 with the shaft of the slide valve of the valve distributor 103 of a hydraulic motor 104 which controls the cross members 12 of the lifting device (see FIGURES 1 and 2). The synchro-receiver 81 may be utilized to visualize the pressure on the overhead line, or may be utilized as a relay for the control of the motors 11 of the lifting device, or the motor may replace motors 11 and may be coupled by any suitable gear means with the shafts 4 of the lifting device.

In FIGURES 16 and 17 the bow or the brushes are hinged on a cross-member by arms, so that the arms may oscillate in a vertical longitudinal plane relative to the track, as disclosed in French Patent No. 1,103,482 or in the British Patent 791,948 and represented in FIGURE 15. A purely electrical servo control may be used, in which a synchro transmitter measures the relative angular variations of the arms, of the lifting device and is connected with a synchro receiver, which controls the movements of the lifting device.

This is represented in FIGURE 16; 5 and 6 are the arms of the lifting device, as in FIGURES 1 and 2. Arms 6 support, by a known mounting, one or several bows 122, one of them being represented.

Bow 122 is mounted on a bracket 121, which is articulated on the lifting device by means of the hinge joint 120 and resiliently supported by spring 123. The synchro transmitter 80 is disposed within the hinge, the stator thereof being fixed in rotation relatively to the lifting device, and the rotor thereof is solid in rotation with bracket 121. The electric connections with synchro receiver 81 and electric motor 93 are the same as in FIGURE 12.

It is to be noted that, in FIGURES 12 to 16, and for insulation purposes if the bows or brushes are used only for measuring the pressure on the overhead line, the same will be preferably made of insulating material.

In FIGURE 17, the measuring and controlling devices are hydraulic. The suspension of the bow is the same as in FIGURE 15. In the hinge 120 is lodged the rotary valve 130 of a rotary valve distributor with said valve being solid in rotation with bracket 121, and the body of the distributor is fixed in rotation relatively to the lifting device.

The structure and operation of such rotary valve distributors are well known in the art. The liquid under pressure is supplied by pipe 131, and the discharge to the reservoir secured by pipe 132, the distributor is connected to the hydraulic jack 135 by pipes 133 and 134 in a conventional manner. Jack 135 controls the lever 10 therefore the arms 5 of the lifting device (see FIGURES 1 and 2). The hydraulic parts are only diagrammatically represented. The driver's cabin of the locomotive of this application is represented in the drawings by block diagram 150.

What I claim is:

1. A pantograph arrangement including a pantograph of the type described comprising a lifting device including a resilient support means for a power pick-up, said power pick-up being guided by a lifting device for the displacement thereof in a vertical plane perpendicular to a track, said resilient support means being disposed at the immediate vicinity of the top of said lifting device, whereby the pressure exerted on said resilient support means is practically reduced to the weight of said power pick-up, and including measurement equipment to measure the tensile stress on said resilient support means and to transform the result of the measurement thereof to vary the movement of said lifting device.

2. An arrangement as set forth in claim 1 and wherein said resilient support means comprises a group of elements including a transverse beam disposed in said vertical plane and having at least one supporting arm for said power pick-up resiliently supported by said traverse beam to oscillate in a vertical plane perpendicular to said traverse beam and wherein said group of elements is included in said measuring equipment as a primary detector.

3. An arrangement as set forth in claim 2 and wherein said measurement equipment includes said primary detector, an end device and a synchro transmitter as an intermediate means between said primary detector and said end device.

4. An arrangement as set forth in claim 1 and wherein a first intermediate means is provided to transmit the result of the measurement of said measurement equipment to an end device comprising a motor for controlling said lifting device of said pantograph, and wherein a second intermediate means is provided between said motor and said lifting device, said second intermediate means being constituted by spring means having one extremity thereof operatively connected to said lifting device and having the other extremity thereof operatively connected to said motor.

5. An arrangement as set forth in claim 1, and wherein said measurement equipment includes a measurement circuit having a synchro transmitter and a synchro receiver located in the driver's cabin of a locomotive.

6. An arraangement as set forth in claim 5, and wherein said synchro transmitter is included in a circuit comprising an electric motor for controlling said lifting device of said pantograph.

References Cited by the Examiner
UNITED STATES PATENTS

| | | | |
|---|---|---|---|
| 1,003,890 | 9/1911 | Eveleth | 191—67 X |
| 1,409,173 | 3/1922 | Healy | 191—67 |
| 1,461,988 | 7/1923 | Spikes | 191—67 |
| 1,612,117 | 12/1926 | Hewlett et al. | 318—24 X |
| 1,862,017 | 6/1932 | House | 318—32 |
| 2,562,727 | 7/1951 | McCaleb | 191—65 |
| 2,582,221 | 1/1952 | Belsey et al. | 318—30 |
| 2,611,191 | 9/1952 | Noxon et al. | 318—30 X |

ARTHUR L. LA POINT, *Primary Examiner.*

JAMES S. SHANK, LEO QUACKENBUSH, EUGENE G. BOTZ, *Examiners.*